(No Model.) G. G. WOLFE. 4 Sheets—Sheet 1.
WATER HEATING ATTACHMENT FOR HOT AIR FURNACES.

No. 451,793. Patented May 5, 1891.

WITNESSES

INVENTOR (No Model.) 4 Sheets—Sheet 3.
G. G. WOLFE.
WATER HEATING ATTACHMENT FOR HOT AIR FURNACES.
No. 451,793. Patented May 5, 1891.

WITNESSES
INVENTOR
Gordon G. Wolfe
by W. E. Hagan atty (No Model.) 4 Sheets—Sheet 4.
G. G. WOLFE.
WATER HEATING ATTACHMENT FOR HOT AIR FURNACES.
No. 451,793. Patented May 5, 1891.
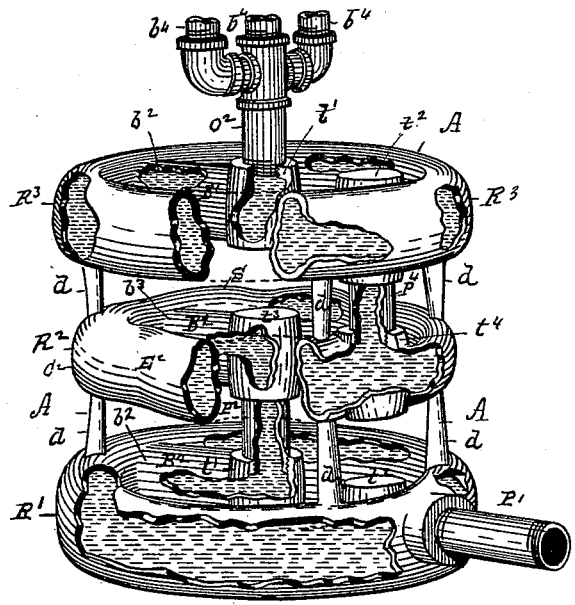
FIG. 6.
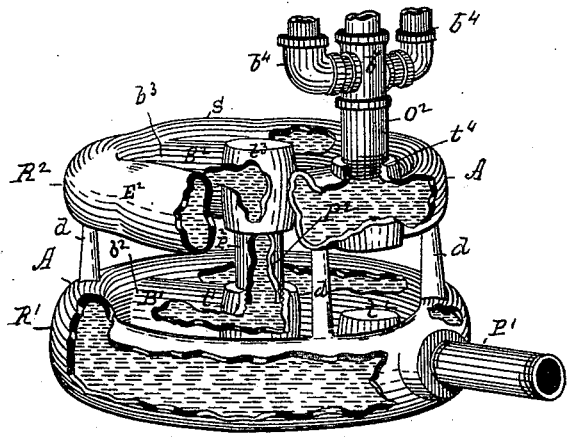
WITNESSES FIG. 5. INVENTOR

UNITED STATES PATENT OFFICE.

GURDON G. WOLFE, OF TROY, NEW YORK.

WATER-HEATING ATTACHMENT FOR HOT-AIR FURNACES.

SPECIFICATION forming part of Letters Patent No. 451,793, dated May 5, 1891.

Application filed March 26, 1890. Serial No. 345,334. (No model.)

*To all whom it may concern:*

Be it known that I, GURDON G. WOLFE, of the city of Troy, county of Rensselaer, and State of New York, have invented new and useful Improvements in Water-Heating Attachments to Hot-Air Furnaces, of which the following is a specification.

My invention relates to improvements in water-heating devices by which they are adapted to be used in connection with the combustion-chamber of a hot-air furnace, or with any other combustion-chamber provided with a fire chamber and grate; and the object and purpose of my invention are to better adapt this class of apparatus to the uses for which they are designed.

Figure 1:
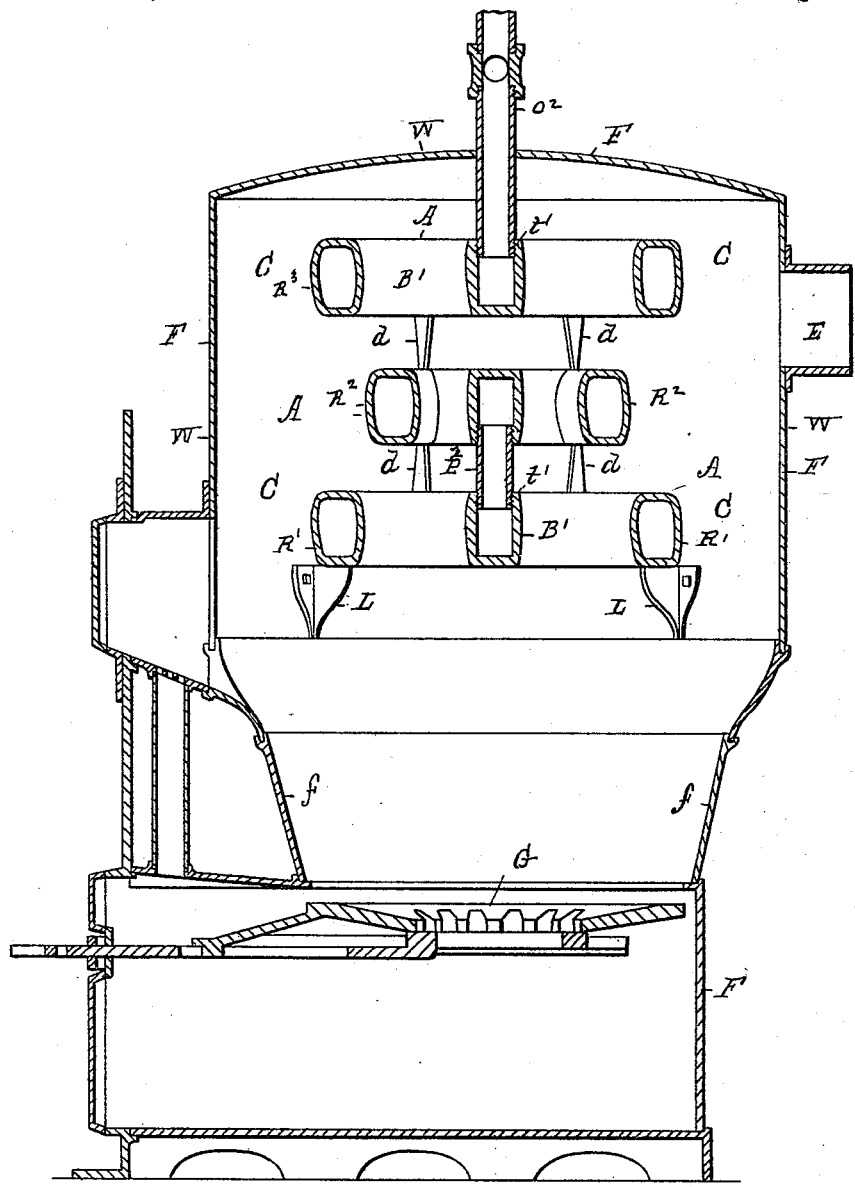

Accompanying this specification to form a part of it there are four plates of drawings, containing six figures, numbered from and including Figure 1 to and including Fig. 6, with the same designation of parts by letter reference used in all of them.

Figure 2:
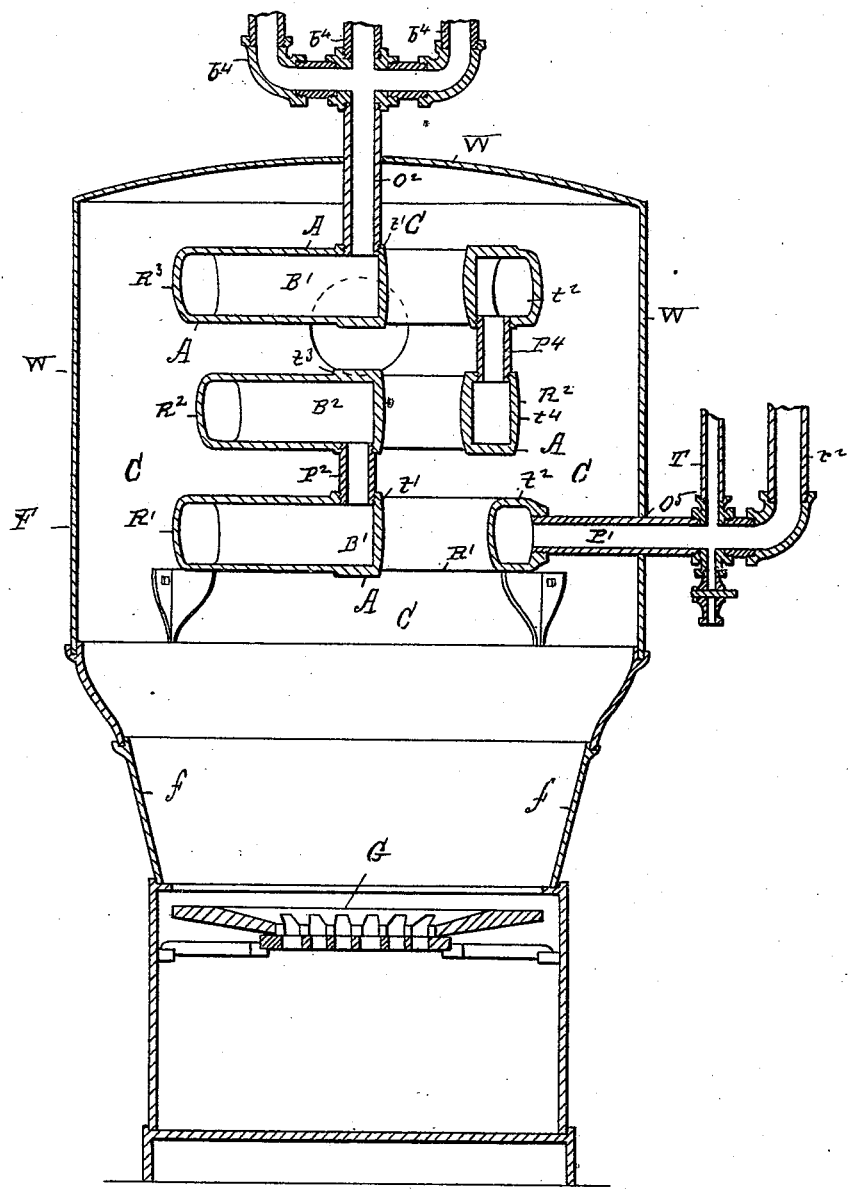
Figure 3:
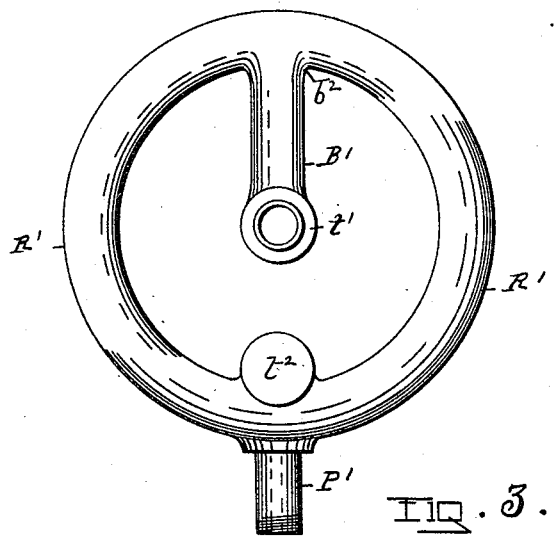
Figure 4:
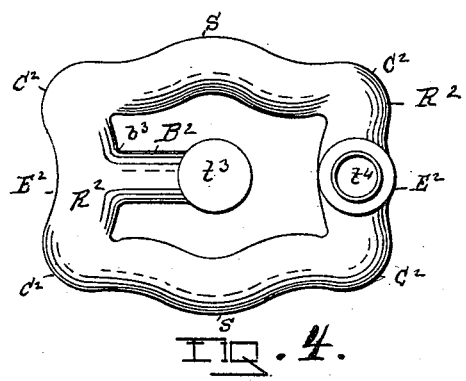

Fig. 1 is a section of the water-heating apparatus and furnace, taken centrally and from front to rear, but with the jacket omitted. Fig. 2 is a section of the apparatus shown at Fig. 1, taken centrally from side to side with the jacket omitted. Fig. 3 is a top view of one of the rings of the water-heating apparatus. Fig. 4 is a top view of another of the water-heating rings. Fig. 5 is a perspective showing the rings shown at Figs. 3 and 4, connected to form a water-heating apparatus. Fig. 6 shows a perspective of a water-heating apparatus composed of two rings like that shown at Fig. 3, one of them arranged at the top of the series, another of them arranged at the bottom of the series, and as intermediately placed one of the rings shown at Fig. 4, said rings being connected by circulating-pipes.

The several parts of the apparatus thus illustrated are designated by letter reference and the function of the parts is described as follows: The letter F designates the furnace-casing, and A the water-heating apparatus. The letter G designates the furnace-grate; $f$, the fire-pot; C, the combustion-chamber; E, the exit or smoke pipe, and W, the wall of the furnace proper, all of which parts with the exception of the water-heating apparatus are of the usual and well-known form, excepting as to the areal capacity of the combustion-chamber.

The water-heater is composed of two or more rings, each having a pipe form in cross-section and each of them made with an inwardly-extended branch pipe that connects with one side of the ring, and which is from where thus connected extended inwardly to the center of the latter, with its end closed and made with a tap-head, and each ring is also made with a tap-head in that side of said ring which is diametrically opposite to where the center pipe connects therewith, so that when said rings are arranged in a series and located one above the other they may alternatingly connect by means of riser-pipes at the center and sides, so as to thus increase the heating-surface area of the hot-water circulation and the distance of its traverse. These rings so composing the water-heater are designated by letter reference, as follows: The letter R' designates one of these rings as arranged for the bottom and top ring of the series of those shown at Fig. 6, and as the bottom ring, where two rings are used, as illustrated at Fig. 5.

The letter P' designates a water-supply or return pipe, which connects with the side of the said ring R', and the letter B' designates a branch pipe, which connects with the ring R' at the side thereof which is diametrically opposite to the point where the return-pipe P' is connected thereto. This branch pipe B', from where connected with the ring, is extended inwardly to the center thereof, with its end stopped off, and it is thereat provided with a tap-head $t'$, made for connection with an upper ring, and it is also made with a tap-head $t^2$ in that part of the ring which is diametrically opposite to where the branch pipe B' connects with said ring at $b^2$.

The letter $R^2$ designates another ring, and shown as being the middle ring of the series of rings shown at Fig. 6 and the upper ring of the two rings composing the water-heater at Fig. 5. This ring $R^2$ has an oblong form with rounded corners $C^2$, outcurved sides S, and incurved ends $E^2$, it being somewhat smaller in its cross-measurements than the bottom ring, but having the same area of pipe diameter. This ring $R^2$ has a branch pipe $B^2$, connecting with one of its ends at $b^3$, and therefrom extended inwardly to the center thereof, with its end thereat stopped off and made with a tap-head $t^3$, and also made with a tap-head $t^4$ in that part of said ring which is diametrically opposite to where at $b^3$ the branch pipe $B^2$ connects therewith.

The letter $d$ designates studs arranged between the rings.

The letter $R^3$ designates the upper ring of the series of three rings shown at Fig. 6, and this ring $R^3$ is a duplicate of the bottom ring $R'$, with the exception that the return pipe is not connected therewith.

The letter $P^2$ designates a riser-pipe that connects at the tap-head $t'$ of the ring $R'$ and with the under side of the tap-head $t^3$ of the ring $R^2$, and the letter $P^4$ designates another riser-pipe which connects with the under side of the tap-head $t^2$ of the ring $R^3$ and the top of the tap-head $t^4$ of the ring $R^2$.

The letter $O^2$ designates the outlet-pipe of the series of rings shown at Fig. 6, and this outlet-pipe has branches $b^4$ $b^4$ $b^4$, from which pipes run to radiators.

As shown at Fig. 5, where only two rings are used, the outlet-pipe $O^2$ is connected with the tap-head $t^4$ of the ring $R^2$ instead of with the center tap-head to give to the water a greater distance of movement in passing through the rings to the outlet. As thus arranged and constructed, water entering the lower ring $R'$ must in a divided current pass through the ring to reach the branch pipe $B'$, to then pass through the latter to the riser-pipe $P^2$, and from the latter to enter the branch pipe $B^2$ of the ring $R^2$, and to pass in a divided current through the latter ring to find egress through the pipe $O^2$ at that side of the ring which is opposite to that which it entered.

As shown at Fig. 6, the construction of the parts evolves the same function by the alternating connection made between the ingress at the branch centers, the egress through the riser-pipe at the side diametrically opposite to that at which it enters, and the egress from the center of the branch pipe of the upper ring.

As thus made and arranged, such number of rings thus alternatingly connected, as is desired, may be used, and they are by their manner of construction adapted to be inserted in the combustion-chamber of a hot-air furnace, as shown at Figs. 1 and 2, with the apparatus supported on brackets L, projected from the inner face of the furnace-wall, as shown at Fig. 1.

The ring $R^2$ being made oblong in form and having less cross width from side to side and end to end than the ring below it, when two rings are used, or the ring $R^2$ and the one above it, when three rings are used, causes a better circulation of the ascending currents than when the rings are placed immediately above and vertically in line with each other, while the curves made in the ring $R^2$ increase its heating area.

With the rings $R'$ and $R^2$ made with the central branch pipe provided with a tap-head, and each of the said rings made with a tap-head at a point diametrically opposite to that at which the branch pipe connects, they are easily molded and cast and adapted to be tapped for connection either at the center or side, so as to be connected in series one above the other, as before described.

While I have shown my apparatus as applied to the combustion-chamber of a hot-air furnace, yet the only part of the latter used in co-operative connection with it is the combustion-chamber in which the apparatus is placed and heated, the other parts of the furnace forming no part of my invention, and the combustion-chamber of the furnace acts upon the hot-water apparatus in the same manner that any combustion-chamber constructed with a grate and fire-pot would do.

Having thus described my invention, what I claim, and desire to secure by Letters Patent, is—

1. A water-heating and water-circulating ring having a branch pipe connecting with one side of the ring and running therefrom to the center of the ring, with its inner end closed, and thereat provided with a tap-head for top or bottom connection, and a tap-head for top or bottom connection arranged on said ring at that side thereof which is opposite to that at which the branch pipe connects with said ring, substantially as and for the purposes set forth.

2. A water-heating and water-circulating ring made with curved sides S, inwardly-curved ends $E^2$, with rounded corners, and having a branch pipe $B^2$ connecting with one of the ends of said ring and running to the center thereof, with its inner end closed, and thereat provided with a tap-head for top or bottom connection, and a tap-head made for top or bottom connection in that one of the ends of the ring which is opposite to that at which the branch pipe connects, substantially as and for the purposes set forth.

3. The combination, with the ring $R'$, having the intake-pipe $P'$ and made with the branch pipe $B'$ connecting with said ring diametrically opposite to where said intake-pipe is connected, said branch pipe running to the center of said ring and thereat made with a tap-head $t'$, of the ring $R^2$, arranged above the other ring and having incurved sides and outcurved ends, and made with a branch pipe $B^2$, running from said ring to the center thereof and thereat having a tap-head $t^3$, and having another tap-head $t^4$ located in said ring $R^2$ diametrically opposite the connection the latter makes with its branch pipe, and a riser-pipe $P^2$, connecting the centrally-located tap-heads of said branch pipes of the two rings, and a riser or outlet pipe $O^2$, connected with the tap-head $t^4$ of the upper ring, substantially in the manner as and for the purposes set forth.

4. In a water-heating attachment to the combustion-chamber of a hot-air furnace, the combination of a series of water-heating and water-circulating rings arranged one above the other therein and each made with a branch pipe running from one side to the center thereof, riser-pipes alternatingly made to connect said rings at their branch-pipe centers and their sides diametrically opposite to where the branch pipes connect with said rings, and an intake-pipe connecting with the bottom ring of the series, and an outlet-pipe arranged on the upper ring, substantially in the manner as and for the purposes set forth.

Signed at Troy, New York, this 9th day of December, 1889, and in the presence of the two witnesses whose names are hereto written.

GURDON G. WOLFE.

Witnesses:
CHARLES S. BRINTNALL,
W. E. HAGAN.